United States Patent
Ghosh et al.

(10) Patent No.: US 12,480,396 B2
(45) Date of Patent: Nov. 25, 2025

(54) CUTTING ELEMENTS FOR A CUTTING TOOL AND METHODS OF MAKING AND USING SAME

(71) Applicant: Element Six (UK) Limited, Didcot (GB)

(72) Inventors: Santonu Ghosh, Didcot (GB); Christopher John Howard Wort, Didcot (GB)

(73) Assignee: Element Six (UK) Limited, Didcot (GB)

( * ) Notice: Subject to any disclaimer, the term of this patent is extended or adjusted under 35 U.S.C. 154(b) by 0 days.

(21) Appl. No.: 18/709,697

(22) PCT Filed: Dec. 28, 2022

(86) PCT No.: PCT/EP2022/087970
§ 371 (c)(1),
(2) Date: May 13, 2024

(87) PCT Pub. No.: WO2023/126451
PCT Pub. Date: Jul. 6, 2023

(65) Prior Publication Data
US 2024/0301786 A1    Sep. 12, 2024

(30) Foreign Application Priority Data
Dec. 31, 2021    (GB) .................................... 2119135

(51) Int. Cl.
*E21B 47/013* (2012.01)
*B22F 5/00* (2006.01)
(Continued)

(52) U.S. Cl.
CPC .............. *E21B 47/013* (2020.05); *B22F 5/00* (2013.01); *B22F 10/28* (2021.01); *B33Y 10/00* (2014.12);
(Continued)

(58) Field of Classification Search
CPC .............................. E21B 47/013; E21B 10/46
See application file for complete search history.

(56) References Cited

U.S. PATENT DOCUMENTS

| | | | |
|---|---|---|---|
| 9,863,243 B1 * | 1/2018 | Hess | ........................ E21B 47/11 |
| 11,111,731 B2 * | 9/2021 | Cao | ........................ E21B 10/55 |

(Continued)

FOREIGN PATENT DOCUMENTS

| | | |
|---|---|---|
| GB | 2588718 A | 5/2021 |
| WO | 2020010241 A1 | 1/2020 |

(Continued)

OTHER PUBLICATIONS

GB Search and Examination Report issued for Application No. GB 2119135.8, dated Jun. 24, 2022 (5 pages).
(Continued)

*Primary Examiner* — Shane Bomar
(74) *Attorney, Agent, or Firm* — Armstrong Teasdale LLP

(57) ABSTRACT

A cutting element (1) for a cutting tool has a sensor element, a body of super hard material (12) having a working surface, the sensor element being attached to a portion of the super hard material (12), and one or more conducting wires extending from the sensor element through one or more channels extending through the body of super hard material. The sensor element is bonded to the body of superhard material through a layer of ceramic adhesive.

22 Claims, 1 Drawing Sheet

(51) Int. Cl.
*B22F 10/28* (2021.01)
*B33Y 10/00* (2015.01)
*B33Y 80/00* (2015.01)
*E21B 10/46* (2006.01)

(52) U.S. Cl.
CPC .............. *B33Y 80/00* (2014.12); *E21B 10/46* (2013.01); *B22F 2005/001* (2013.01); *B22F 2301/15* (2013.01); *B22F 2998/10* (2013.01)

(56) References Cited

U.S. PATENT DOCUMENTS

| | | | | |
|---|---|---|---|---|
| 11,668,185 | B2* | 6/2023 | Zhan | E21B 47/013 175/40 |
| 2012/0312599 | A1* | 12/2012 | Trinh | E21B 47/00 175/428 |
| 2013/0068525 | A1* | 3/2013 | DiGiovanni | E21B 12/00 29/592.1 |
| 2014/0047776 | A1* | 2/2014 | Scott | E21B 10/567 51/297 |
| 2014/0326506 | A1 | 11/2014 | Difoggio | |
| 2019/0234151 | A1* | 8/2019 | Olsen | B22F 7/08 |
| 2020/0011170 | A1* | 1/2020 | Cao | E21B 10/573 |
| 2020/0011171 | A1* | 1/2020 | Cao | E21B 10/567 |
| 2022/0234113 | A1* | 7/2022 | Ghosh | B23B 27/145 |
| 2023/0003120 | A1* | 1/2023 | Ghosh | E21B 10/52 |
| 2023/0015853 | A1* | 1/2023 | Wort | E21B 10/56 |

FOREIGN PATENT DOCUMENTS

| | | |
|---|---|---|
| WO | 2020239799 A1 | 12/2020 |
| WO | 2021136776 A1 | 7/2021 |

OTHER PUBLICATIONS

GB Search Report issued for Application No. GB 2219793.3, dated Jun. 8, 2023 (4 pages).

PCT International Search Report and Written Opinion issued for Application No. PCT/EP2022/087970, dated Apr. 26, 2023 (12 pages).

\* cited by examiner

CUTTING ELEMENTS FOR A CUTTING TOOL AND METHODS OF MAKING AND USING SAME

CROSS-REFERENCE TO RELATED APPLICATIONS

This application is a § 371 national stage of International Application No. PCT/EP2022/087970, filed Dec. 28, 2022, which claims priority to Great Britain Application No. 2119135.8, filed Dec. 31, 2021.

BACKGROUND

The present disclosure generally relates to cutting elements including a sensor element for use on or in connection with a cutting insert or cutting tool for earth-boring tools such as drill bits, to earth-boring tools including such cutting elements, and to methods of making such cutting elements and tools.

In the oil and gas industry, cutting tools such as downhole drill bits, including roller cone bits and fixed cutter bits, are designed and manufactured to minimize the probability of catastrophic drill bit failure during drilling operations. During drilling operations the loss from a drill bit of a roller cone, or a polycrystalline diamond compact acting as a cutter element therein can impede the drilling and may necessitate an expensive and time consuming operation to retrieve the bit or components thereof from the wellbore before catastrophic damage to the drill bit itself occurs.

Conventionally, logging while drilling (LWD) and measuring while drilling (MWD) measurements are obtained from measurements behind the drill head and are therefore off-set from the drill bit itself and the cutting elements therein. While a number of sensors and measurement systems may record information near the earth-boring drill bit, conventional polycrystalline diamond (PCD) cutting elements used in earth-boring drill bits do not provide measurements directly at the drill bit. This off-set of the sensors may contribute to errors in measurements that relate directly to the condition of the cutting elements or nature of the formation being drilled.

Drill bits used for boring into the earth for oil or gas exploration typically include arrays of PCD cutter elements, which are driven against rock deep beneath the earth's surface to cut through rock formations. In such operations, a bit may need to bore through several types of geological formations and an operator may wish to have an indication of the formation currently being bored.

There is a need for operators of cutting tools to gain insight into certain characteristics of workpiece material being cut. In particular, but not exclusively, operators of earth-boring bits may benefit from having near real-time indication of characteristics of rock in a formation being drilled.

In drilling operations, a cutting element, also termed an insert, is subjected to heavy loads and high temperatures at various stages of its useful life. In the early stages of drilling, when the sharp cutting edge of the insert contacts the subterranean formation, it is subjected to large contact pressures. This results in the possibility of a number of fracture processes such as fatigue cracking being initiated. As the cutting edge of the insert wears, the contact pressure decreases and is generally too low to cause high energy failures. However, this pressure can still propagate cracks initiated under high contact pressures and may eventually result in spalling-type failures. In the drilling industry, PCD cutter performance is determined by a cutter's ability to achieve high penetration rates in increasingly demanding environments, and still retain a good condition post-drilling (enabling re-use if desired). In any drilling application, cutters may wear through a combination of smooth, abrasive type wear and spalling/chipping type wear. Whilst a smooth, abrasive wear mode is desirable because it delivers maximum benefit from the highly wear-resistant PCD material, spalling or chipping type wear is unfavourable. Even fairly minimal fracture damage of this type can have a deleterious effect on both cutting life and performance.

Cutting efficiency may be rapidly reduced by spalling-type wear as the rate of penetration of the drill bit into the formation is slowed. Once chipping begins, the amount of damage to the diamond table continually increases, as a result of the increased normal force required to achieve a given depth of cut. Therefore, as cutter damage occurs and the rate of penetration of the drill bit decreases, the response of increasing weight on bit may quickly lead to further degradation and ultimately catastrophic failure of the chipped cutting element.

PCD cutting elements are typically provided with a theoretical usable lifetime which may be predicted in terms of, for example, time, number of metres cut, number of drilling operations and the like. However, as chipping is a brittle process, the performance of any individual cutting element may greatly exceed that of another individual cutting element, and this effect is difficult to predict which may have an impact on the actual useable lifetime of any individual cutting element.

There is a need to be able to detect parameters during use of the cutting element such as chipping, and wear scar size, and to measure or predict cutting element life more accurately during operation, leading to less risk of damaging the drill bits or tools into which the cutting elements are inserted and also to obtain information relating to performance or behaviour of a drill bit and related components whilst the drill bit is being used as this may be useful for characterising and evaluating the durability, performance and potential failure of the drill bit or components thereof. However, as cutting elements experience harsh environments during drilling applications, attaching a sensor to a cutting element to withstand such environments to detect, measure or predict parameters indicative of the state of the cutting element or formation being drilled is extremely difficult. In particular, temperatures above 150° C., high pressures experienced whilst drilling or boring, and high levels of vibration, which the cutting elements would be subjected to in such applications would render any sensor attached to the cutter vulnerable to becoming detached from the cutting element.

Similarly, attaching a sensor inside a cutting element would require robust bonding with and to the cutting element to withstand use in such harsh application environments. Whilst braze alloys potentially form a strong bond between metals and ceramics and may theoretically be used to attach a sensor element to a cutting element, braze alloys are typically electrically conductive in nature and therefore could distort the output of the sensor and its measurements when in contact with the conductive part of the cutting element. There is therefore a need to provide a means of attaching a sensor to a cutting element such that the sensor is insulated from the conducting part of the cutting element whilst also being attached securely to the cutting element to minimise the risk of the sensor becoming detached from the cutting element in harsh drilling applications.

SUMMARY

According to a first version there is provided a cutting element for a cutting tool, comprising:
a sensor element;
a body of super hard material having a working surface; the sensor element being attached to a portion of the super hard material; and
one or more conducting wires extending from the sensor element through one or more channels extending through the body of super hard material;
wherein the sensor element is bonded to the body of superhard material through a layer of ceramic adhesive According to a second version there is provided an earth-boring tool, comprising:
a body;
at least one cutting element as defined above attached to the body; and
a data acquisition module configured to receive a signal from the sensor element in the cutter element, through the one or more conducting wires.

According to a third version there is provided a method of using a cutting element as defined above comprising:
engaging a workpiece body with the cutting element to remove workpiece material from the workpiece body, and allowing the working surface of the cutter element to engage external material containing workpiece material;
generating a signal to flow from the sensor element through the one or more conducting wires; and
analysing the signal to determine a characteristic of the external material.

According to a fourth version there is provided a method of forming a cutting element for a cutting tool comprising:
a body of superhard material bonded to a substrate along an interface, the body of super hard material having a working surface spaced from and opposing the interface with the substrate; the cutting element further comprising one or more channels extending through the body of superhard material and substrate;
inserting one or more insulated conducting wires in a respective one or more of said channels;
applying a layer of ceramic adhesive to a portion of the working surface defining a wall of a cavity therein and/or to at least a portion of the surface defining the wall of a respective channel(s) external to the insulated conducting wire(s);
heating the ceramic adhesive to bond the adhesive to the portion of the working surface and portion of the surface defining the wall(s) of the respective channel(s);
locating a sensor element in the cavity and applying a heat treatment to bond the sensor element the body of superhard material through the layer of ceramic adhesive and electrically connect the one or more conducting wires to the sensor element.

Various example methods and systems are envisaged by this disclosure, of which various non-limiting, non-exhaustive examples and variations are described as follows.

BRIEF DESCRIPTION OF THE DRAWINGS

Non-limiting example arrangements to illustrate the present disclosure are described with reference to the accompanying drawings, in which.

DETAILED DESCRIPTION

Figure 1:
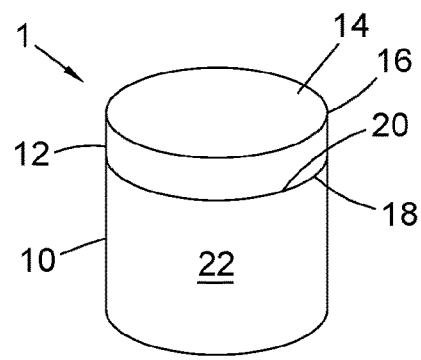
FIG. 1 is a schematic drawing of a cutting element for drilling applications.

Referring in general to the following description and accompanying drawings, various versions of the present disclosure are illustrated to show its structure and method of operation. Common elements of the illustrated examples are designated by the same reference numerals.

Certain terms as used herein will be briefly explained.

As used herein, "hard" material has a Knoop hardness of at least about 1000 kg·mm$^{-2}$. A hard material may include a polycrystalline hard material comprising grains of hard material cemented together by a relatively softer material. Examples of hard material may include silicon carbide, silicon nitride, alumina and cemented tungsten carbide (which may be referred to as "hard-metal").

As used herein, "super-hard" material has a load-independent Vickers hardness of at least about 28 GPa; some super-hard materials may have a load-independent Vickers hardness of at least about 30 GPa, or at least about 40 GPa. As used herein, Vickers hardness is according to the ASTM384-08a standard.

Some example super-hard materials may include polycrystalline super-hard materials comprising grains of super-hard material cemented together by a relatively softer material; or in which a substantial fraction of the super-hard grains are directly bonded to each other (for example, intergrown), potentially including interstitial regions between the super-hard grains. Interstitial regions may include non-super-hard filler material, and/or interstitial regions may include voids. Examples of super-hard material may include single crystal diamond, polycrystalline diamond (PCD), cubic boron nitride (cBN), polycrystalline cBN (PCBN), diamond produced by chemical vapour deposition (CVDD), or diamond grains cemented by a hard material such as silicon carbide.

A super-hard polycrystalline material may comprise an aggregation of a plurality of super-hard grains such as diamond or cBN grains, a substantial portion of which may be directly inter-bonded and may include interstitial regions among the super-hard grains. The interstitial regions may contain non-super-hard filler material such as metal in elemental or alloy form, ceramic material or intermetallic material, for example. The filler material may bind the super-hard grains together, and/or at least partially fill the interstitial regions. The content of the super-hard grains in super-hard polycrystalline material may be at least about 50 volume %, or at least about 70 volume %, or at least about 80 volume %; and/or at most about 97 volume %, or at most about 95 volume %, or at most about 90 volume % of the polycrystalline material.

As used herein, polycrystalline diamond (PCD) material comprises a plurality of diamond grains, a substantial portion of which are directly inter-bonded with each other or contact each other at grain boundaries. Polycrystalline diamond may comprise diamond grains or include non-diamond material or voids. In some PCD material, the diamond grains may account for at least 80% of the volume of PCD material, substantially all the remaining volume being a network of interstitial regions among the diamond grains. The interstitial regions may be partly or entirely filled with diamond sintering aid material such as residual catalyst/binder, or other filler material, or at least some of the interstitial regions may contain voids. Sintering aid for diamond may also be referred to as "catalyst material" for promoting the growth of diamond grains or the formation of diamond necks between adjacent diamond grains, under thermodynamically stable conditions for diamond. Catalyst material for diamond may also function as solvent material for carbon, and diamond sintering aid material may also be referred to as "solvent/catalyst" material. Examples of solvent/catalyst materials for diamond include iron (Fe), nickel (Ni), cobalt (Co) and manganese (Mn), and certain alloys including at least one of these elements. PCD material may be produced by subjecting an aggregation of diamond grains to an ultra-high pressure (for example, at least about 6 GPa) and a high temperature (for example, at least about 1,200° C.) in the presence of molten solvent/catalyst material. During the HPHT process, solvent/catalyst material may infiltrate through the interstitial regions among the diamond grains from an adjacent source, such as a Co-cemented tungsten carbide substrate. Consequently, PCD material may comprise the inter-bonded diamond grains and interstitial regions containing Co. Some polycrystalline diamond material consisting essentially of diamond may be manufactured by a chemical vapour deposition (CVD) process.

As used herein, "electrically conductive" may include (doped or undoped) semiconductor materials, including doped wide-bandgap semiconductor materials such boron- or phosphorus-doped diamond.

As used herein, a "workpiece body" means a body, or a portion of a body, being processed by a tool to remove material from the body. For example, a workpiece may include a rock formation in the earth, or a body of raw material processed by a machine tool.

As used herein, swarf may comprise chips (or "cuttings") of material removed from a workpiece or rock formation by means of a cutter element, and/or other debris generated by a cutting or other material removal process. In various examples, swarf may comprise chips, and/or other materials present in the cutting environment, such as lubricant and/or flushing and/or cooling fluid, which may include bubbles (in other words, swarf may include one or two fluid phases). For example, swarf arising from an earth-boring process may comprise slurry material, including rock chips, fragments of rock, sand and water. Swarf may include particles of cutting tool material, arising from abrasion or erosion of the cutting tool.

As used herein, a "rake face" is a surface area of a cutter element, over which chips of workpiece material will flow, when the cutter element is used to cut a workpiece.

As used herein, "drill bit" means and includes any type of bit or tool used for drilling during the formation or enlargement of a wellbore in subterranean formations and includes, for example, fixed cutter bits, rotary drill bits, percussion bits, core bits, eccentric bits, bi-center bits, reamers, mills, drag bits, roller cone bits, hybrid bits and other drilling bits and tools known in the art.

As used herein, a "superhard construction" means a construction comprising a body of polycrystalline superhard material. In such a construction, a substrate may be attached thereto or the body of polycrystalline material may be free-standing and unbacked.

Cutter elements for use in drill bits in the oil and gas industry typically comprise a layer of polycrystalline diamond (PCD) bonded to a cemented carbide substrate. PCD material is typically made by subjecting an aggregated mass of diamond particles or grains to an ultra-high pressure of greater than about 5 GPa, and temperature of at least about 1200° C., typically about 1440° C., in the presence of a sintering aid, also referred to as a solvent-catalyst material for diamond. Solvent-catalyst materials for diamond are understood to be materials that are capable of promoting direct inter-growth of diamond grains at a pressure and temperature condition at which diamond is thermodynamically more stable than graphite.

As mentioned above, examples of solvent-catalyst materials for diamond are cobalt, iron, nickel and certain alloys including alloys of any of these elements.

The term "substrate" as used herein means any substrate over which the superhard material layer is formed. For example, a "substrate" as used herein may be a transition layer formed over another substrate.

The superhard construction shown in the figures may be suitable, for example, for use as a cutter insert for a drill bit for boring into the earth. Such an earth-boring drill bit (not shown) includes a plurality of cutting elements, and typically includes a bit body which may be secured to a shank by way of a threaded connection and/or a weld extending around the earth-boring drill bit on an exterior surface thereof along an interface between the bit body and the shank. A plurality of cutting elements are attached to a face of the bit body, one or more of which may comprise a cutting element as described herein in further detail below.

In an example as shown in FIG. 1, a cutting element 1 includes a substrate 10 with a layer or body of superhard material 12 formed on the substrate 10. The substrate 10 may be formed of a hard material such as cemented tungsten carbide. The superhard material 12 may be, for example, polycrystalline diamond (PCD), and may include a thermally stable region such as thermally stable PCD (TSP). The cutting element 1 may be mounted into a bit body such as a drag bit body (not shown) and may be suitable, for example, for use as a cutter insert for a drill bit for boring into the earth.

The exposed top surface of the superhard material opposite the substrate forms the cutting face 14, which is the surface which, along with its edge 16, performs the cutting in use.

At one end of the substrate 10 is an interface surface 18 that forms an interface with the superhard material layer 12 which is attached thereto at this interface surface. As shown in the example of FIG. 1, the substrate 10 is generally cylindrical and has a peripheral surface 20 and a peripheral top edge 22.

As used herein, a PCD grade is a PCD material characterised in terms of the volume content and size of diamond grains, the volume content of interstitial regions between the diamond grains and composition of material that may be present within the interstitial regions. A grade of PCD material may be made by a process including providing an aggregate mass of diamond grains having a size distribution suitable for the grade, optionally introducing catalyst material or additive material into the aggregate mass, and subjecting the aggregated mass in the presence of a source of catalyst material for diamond to a pressure and temperature at which diamond is more thermodynamically stable than graphite and at which the catalyst material is molten. Under these conditions, molten catalyst material may infiltrate from the source into the aggregated mass and is likely to promote direct intergrowth between the diamond grains in a process of sintering, to form a PCD structure. The aggregate mass may comprise loose diamond grains or diamond grains held together by a binder material and said diamond grains may be natural or synthesised diamond grains.

Different PCD grades may have different microstructures and different mechanical properties, such as elastic (or Young's) modulus E, modulus of elasticity, transverse rupture strength (TRS), toughness (such as so-called $K_1C$ toughness), hardness, density and coefficient of thermal expansion (CTE). Different PCD grades may also perform differently in use. For example, the wear rate and fracture resistance of different PCD grades may be different.

All of the PCD grades may comprise interstitial regions filled with material comprising cobalt metal, which is an example of catalyst material for diamond.

The PCD structure 12 may comprise one or more PCD grades.

Figure 2:
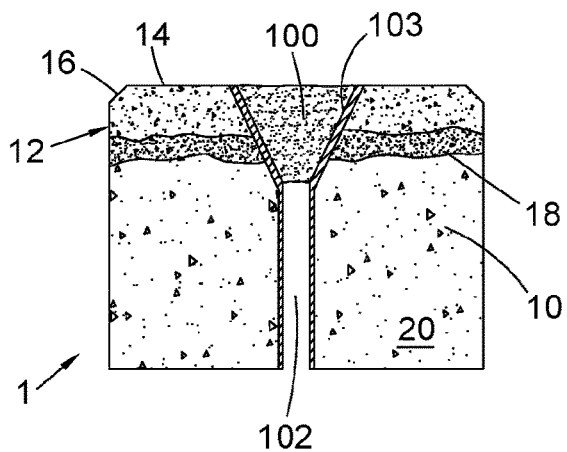
FIG. 2 is a schematic cross-sectional view through an example cutting element in a first stage of assembly to attach a sensor element.
Figure 3:
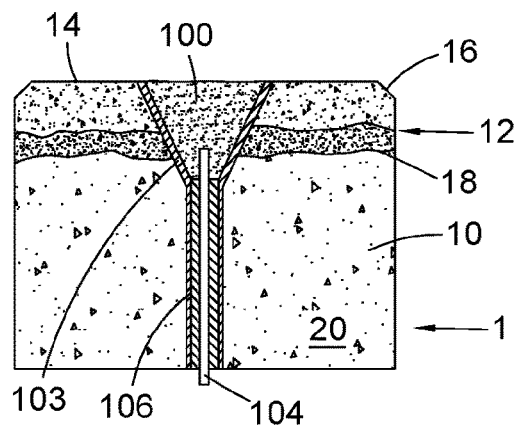
FIG. 3 is a schematic cross-sectional view of the cutting element of FIG. 2 in a second stage of assembly to attach the sensor element.
Figure 4:
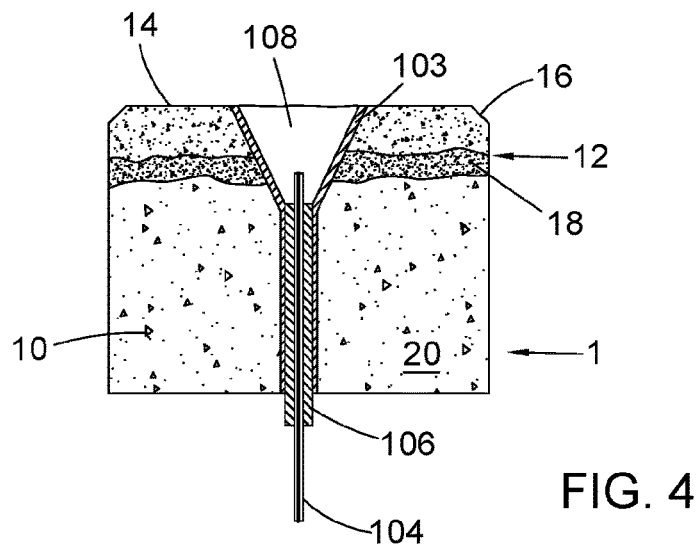
FIG. 4 is a schematic cross-sectional view of the cutting element of FIGS. 2 and 3 in a third stage of assembly to attach the sensor element.

Once the cutting element 1 of FIG. 1 has been formed, a first example sensor element for use in such a cutting element for a drill bit may be attached to the cutting element as shown in FIGS. 2 to 4.

As shown in the example of FIG. 2, a cavity 100 is created in the layer 12 of superhard material of the cutting element 1. This may be formed in situ in the sintering stage of forming the cutting element by means of a suitable punch to create the desired shape of cavity, or it may be formed post sintering, in a subsequent processing step by various means, such as EDM machining or laser cutting or laser ablation. A longitudinal bore 102 extending from the base of the cavity 100 and through the substrate 10 is also created, again either for example in a post sintering processing step by EDM or laser cutting or ablation techniques. The cavity 100 is to retain the sensor in the end product and the longitudinal bore 102 is to retain the connecting wire(s) which will pass the signal from the sensor to the processing electronics retained for example in the drill bit or in a location in the drill string.

In some examples the body of superhard material 12 is polycrystalline diamond (PCD) material. It is known that the surface energy of PCD is low which means the level of molecular force of attraction to another material to adhere another material to PCD is weak. It may therefore be difficult to attach a sensor element to the PCD material in a manner strong enough to withstand the extreme conditions experienced during drilling applications.

In a first example, a surface treatment is carried out in a first processing stage to increase the surface energy of the PCD defining the wall of the cavity 100 to improve potential adhesion thereto. The first surface treatment applied is to oxidise the exterior surface of the superhard (PCD) material defining the cavity wall to form an oxidised surface 103. In a first example, this includes heating the cutting element 1 to a temperature of around 500° C. for around 30 minutes to oxidise the desired surface region. In a second stage, the surface energy of the superhard material 12 of the cutting element 1 was increased by treating the oxidised surface region with a mixture of methane and hydrogen ($CH_4/H_2$).

In a separate step, the surface of the conducting wire(s) 104 that is/are to connect the sensor to processing electronics is/are oxidised to form a thin layer of oxide 106 thereover by, for example treating the wire(s) at a temperature of around 600° C. for around 1 hour. The conducting wire(s) is/are then inserted through the longitudinal bore 102 extending through the cutting element 1 and opening into the cavity 100, as shown in FIG. 3 for subsequent connection to the sensor which is to be retained in the cavity 100. The connecting (conducting) wire(s) is/are insulated to protect the wire(s) 104 from conducting signals from the surrounding conductive material in the cutting element 1 in which it is to be located. The wire(s) 104 may be, for example, formed from copper and/or molybdenum.

In a further stage, a layer of a ceramic adhesive such as an adhesive comprising alumina silicate, for example in the form of a high alumina silicate glass powder (having a melting temperature of between around 650 to around 750° C.) was placed on the treated surface 103 of the PCD layer 12 defining the wall of the cavity 100 and packed into the longitudinal bore 102 to retain it therein between the outer surface 106 of the insulated wire(s) and the treated surface of the PCD defining a portion of the bore extending through the PCD layer 12. The cutting element was then further treated at a temperature of around 700° C. to create a glass coated surface defining the wall of the cavity 100 and wall of the bore 102 to bond the insulated surface of the wire(s) 106 in place in the bore 102.

In a still further stage, as shown in FIG. 4, the sensor is located in the cavity 100 and connected electrically to the wire(s) 104, and bonded into position in the cavity 100. In one example, the sensor may comprise a sensor, such as an electrochemical sensor, comprising one or more metal electrodes. In one example, Ni—Cr and/or Cu (copper) electrodes may be used as the sensor to provide the desired measurements. In some examples, bonding between the electrodes of the sensor, connecting wire(s) 102 and the coated surface 103 of the wall of the PCD defining the cavity 100 may achieved for example through selective laser sintering. The oxidised surface of the connecting wire(s) 106 that is protruding into the cavity 100 is removed, and a first mass of Ni—Cr powder is placed into the cavity 100. In one example the average particle size of the Ni—Cr powder may be, for example, around 30 microns. Selective laser sintering is then carried out, layer by layer. The laser source is used to provide thermal energy and selectively fuse together the particles of the Ni—Cr powder retained in the cavity 100 to form a first layer therein, onto which a further layer of Ni—Cr powder is applied to form a second layer, and so forth, to build up a layered structure filling the cavity 100. As lasers are capable of generating very high temperatures, the top of the connecting wire(s) 104 are ablated and sintered with the Ni—Cr powder thereby connecting the wire(s) 104 to the electrode(s) formed by the sintered Ni—Cr powder. The laser sintering also assists in forming a strong bond between the glass layer 103 coating the wall of the cavity 100 and the Ni—Cr electrode(s) 108 formed therein.

In some examples, the PCD material comprised in the superhard portion 12 may include a first PCD volume and a second PCD volume. The first PCD volume may be electrically insulating and the second PCD volume may be electrically conducting and include cobalt. The second PCD volume may be coterminous with the interface boundary 18 with the substrate portion 10, located remotely from the working surface 14, while the first PCD volume may be coterminous with the working surface 14. The superhard portion 12 may have a thickness of about 2 mm to about 4 mm or more, from the working surface 14 to the interface boundary 18; and the first PCD volume may have a mean thickness of about 100 microns to about 1500 microns or more, from the working surface 14 to an interface boundary with the second PCD volume.

PCD material comprises an aggregated plurality of directly inter-grown diamond grains and a plurality of interstitial regions between diamond grains (not visible in FIG. 1). The interstitial regions in the second PCD volume may be filled with filler material comprising cobalt, which had infiltrated from the substrate portion 10 during the process of sintering the diamond grains against the substrate portion 10. A substantial portion of the cobalt (and/or other electrically conducting material) that had been present in the first PCD volume may be removed from the interstitial regions by treating the first PCD volume in acid, to leach out metallic material. The first PCD volume may include interstitial voids and less than about 2 wt. % of cobalt, or substantially no cobalt. Consequently, the first PCD volume may form an electrically insulating portion and the second PCD volume may be electrically conducting.

In other examples, the superhard portion 12 may comprise a single volume which may or may not comprise residual solvent catalyst such as cobalt in interstitial spaces between, for example, interbonded diamond grains in the example where the superhard portion comprises polycrystalline diamond (PCD) material.

In the examples where the superhard portion 12 comprises PCD, the PCD material may be, for example, formed of diamond grains that are of natural and/or synthetic origin.

Whilst FIGS. 2 to 4 show only a single longitudinal bore 102 through the cutting element 1, two or more respective through-holes 103 may be formed through the element each through-hole housing respective wires 104. As shown, the wires 104 are housed within a respective electrically insulating sheath 106, to electrically isolate them from the superhard portion 12 and from the substrate portion 10. Respective distal ends of the wires may extend beyond the distal end of the cutting element, or be guided by the through-holes to emerge from a side or the base of the cutting element. Each wire thus provides a respective electrically conducting connection between the sensor element attached to the cutting element 1 and distal ends of the wires, which may have terminals (not shown) for connecting the wires 104 to a measurement device.

The distal ends of the wires 104 may be electrically connected to respective devices to allow various measurements or provide indications of characteristics such as temperatures and/or pressures at the working surface 14 of the cutting element 1 to be measured in use when the sensor element contacts the external material being processed in application.

In use, a computer system (not shown) may be communicatively connected to the wires, allowing the computer system to receive data indicative of, for example, the temperature of the cutting element and/or pressure detected as being applied to the cutting element during use. Additionally or alternatively, the computer system may comprise an executable computer program, configured to process the received data to determine the characteristics of the external material being processed when the sensor element is in use during cutting or drilling applications. The computer program may have access to various other data, such as properties of various kinds of rock formations and other materials such as water and/or oil, as well as various relationships between measurable parameters.

Based on a response of the sensor element, information relating to the performance of the cutting element, such as thermal and mechanical data may be obtained such as stresses and pressures. Although cutters are illustrated and described herein as exemplary, other versions of the present disclosure may include other components within the drill bit being configured for obtaining information related to the drill bit or material being processed such as the rock being drilled through.

An example method of using an example sensor element attached to a cutting element 1, mounted onto an earth-boring bit (not shown), will be described. An example cutting tool may comprise a fixed-cutter type of earth-boring bit, for use in oil and gas exploration, and an example sensor may be implemented as a cutter element 1 for the earth-boring bit. The earth-boring bit may comprise a bit body, including a crown and a steel blank. The steel blank may be partially embedded in the crown, which may be formed of tungsten carbide grains embedded in a copper alloy matrix material. The bit body has a bit face and a plurality of blades, arranged azimuthally about a longitudinal axis defined by a longitudinal bore and spaced apart from each other by junk slots. The bit body may be secured to a steel shank by way of a threaded connection and a weld, which extends around the drill bit on an exterior surface, along an interface between the bit body and the steel shank. The steel shank may have a threaded connection portion for attaching the drill bit to a drill string, which may include a tubular pipe and segments coupled end to end between the earth-boring drill bit and other drilling equipment at the surface of the earth. Internal fluid passageways may extend between the bit face and the longitudinal bore, which extends through a steel shank and partially through the bit body. Nozzle inserts may also be provided at the bit face within the internal fluid passageways.

As mentioned above, the example sensors may be configured as cutter elements for an earth-boring bit and each cutter element 1 may have a substantially cylindrical shape and comprise a superhard portion 12 formed of PCD material and a substrate portion 10 formed of cobalt-cemented tungsten carbide attached to the superhard portion 12, each superhard portion 12 having a respective cutting surface 14 and cutting edge 16. A plurality of cutter elements 1, including the sensor element, may be attached at the bit face, in which a part of the substrate portion 10 of each cutter element 1 may be brazed within a respective pocket provided in the bit face. Each cutter element 1 may be supported from behind by a respective buttress, which may be integrally formed with the crown.

In some example arrangements, the earth-boring bit may include a data collection module, to which the wire(s) of the sensor may be electrically connected. The data collection module may include components such as an analogue-to-digital converter, a computer processor, executable software and other components for collecting and/or interpreting data generated by the sensor element in use.

In operation, electrical signals representative of an applied stimulus such as pressure or temperature from the sensor transmitted through conductive wire(s), may convey the signals to the data collection module. Such data transmission may include wired or wireless communication. A processing module may be located, for example, within the drill bit itself for further processing of the data.

During drilling operations, the earth-boring bit may be positioned at the bottom of a bore hole such that the cutter elements 1 are adjacent the earth formation to be drilled, and the earth-boring bit is driven to rotate within the bore hole. As the earth-boring bit is rotated, drilling fluid is pumped to the bit face through the longitudinal bore and the internal fluid passageways. Rotation of the drill bit causes the cutter elements 1 to scrape across and shear away material at the surface of the underlying rock formation. Swarf including chips (which may also be referred to as cuttings) of the rock formation combined with, and/or suspended within, the drilling fluid is generated by the earth boring operation. As the earth-boring bit rotates, the cutter elements 1 can shear away material from the surface of the formation, generating a significant amount of heat and mechanical stress within the cutter elements 1. The swarf can pass through the junk slots and an annular space between the bore hole and the drill string and move to the surface of the earth.

As the earth boring bit drives the example cutting element 1 with the sensor attached thereto, the cutting edge 16 cuts rock from the rock formation, generating swarf material including one or more rock chip as well as water and/or oil. The swarf may contact the working surface 14, at least an area of which functioning as a rake face, guiding the swarf away from the cutting edge 16. The PCD material comprised in the superhard portion 12 will be highly resistant to abrasive or erosive wear by rock chips passing over the working surface 14.

An indication of certain characteristics of the swarf and potentially the underlying rock formation may be obtained as, in general, the electrical properties of the sensing element may depend on its temperature and/or on the compressive force applied to it.

For example, the electrical resistivity of the sensor may change dependent on a compressive force applied to it.

Some example methods of using an example sensor element may include determining a change in the material composition of rock or other material being cut. This information may be conveyed to an operator, to allow them to modify operating parameters dependent on characteristics of the workpiece material. For example, if the sensor element attached to a cutting element is attached to an earth-boring bit, measurement of electrical characteristics of the rock, and/or of swarf containing chips of rock, may indicate whether the earth-boring bit is boring through an oil-containing formation. The indicated characteristics of the external material may change substantially when the earth-boring bit moves from water-containing to oil-containing formation, or vice versa. The measurement may indicate a magnitude of porosity of the formation and the load on the earth-boring bit may be modified dependent on this information. The measurement may indirectly indicate the compressive strength, or other mechanical characteristic, of the formation.

An example method of making an example cutting element 1 of any one or more of FIGS. 1 to 4, for an earth-boring bit, will be described.

A precursor body comprising a PCD portion joined to a cobalt-cemented tungsten carbide (Co—WC) substrate portion may be manufactured by means of an ultra-high pressure, high temperature (HPHT) process. An HPHT process may include placing an aggregation of diamond grains onto the Co—WC substrate, providing a pre-sinter assembly (not shown), and subjecting the pre-sinter assembly to a pressure of at least about 6 GPa and a temperature of at least about 1,250° C. In some example processes, the aggregation of diamond grains may include catalyst material such as Co, in powder form or as deposited microstructures on the diamond grains. The Co within the substrate and potentially within the aggregation of diamond grains will melt, infiltrate into interstitial regions among the diamond grains under capillary action and promote the direct inter-growth of neighbouring diamond grains. When the pressure and temperature are decreased to ambient conditions, the Co (or alloy including Co, for example) will solidify, providing a precursor body comprising the layer of PCD material 12 joined to the substrate portion 10, to which the sensor element can be attached (as used herein, ambient or atmospheric pressure is about 1.0 MPa and ambient temperature is about 20° C. to about 40° C.).

The precursor body may be substantially cylindrical, having a proximal end and a distal end, in which the PCD layer 12 is coterminous with the proximal end and the substrate portion 10 is coterminous with the distal end. The precursor body may be processed by grinding the PCD layer 12 to form a cutting edge 16 and, in some examples, one or more chamfers adjacent the cutting edge 16. The PCD layer 12 may be treated with acid to remove Co from interstitial regions among the diamond grains within a first PCD volume, coterminous with the working surface 14, using a process referred to as acid leaching. After acid leaching, the interstitial regions within the first PCD volume may contain no more than about 2 wt. % Co, rendering the first PCD volume substantially electrically insulating. The second PCD volume, in which the interstitial regions are still filled with Co-containing metal, may remain non-leached and extend from an interface boundary with the first PCD volume to the interface boundary 18 between the PCD superhard portion 12 and the substrate portion 10.

In some examples, the cemented carbide substrate 10 may be formed of tungsten carbide particles bonded together by the binder material, the binder material comprising an alloy of any one or more of Co, Ni and Cr. The tungsten carbide particles may form at least 70 weight percent and at most 95 weight percent of the substrate.

After sintering, the PCD construction was subjected to further treatment to remove the canister material and to shape the construction to the desired cutting element shape and size and to attach and create the sensor element, as described above with respect to FIGS. 2 to 4.

In the example of FIGS. 2 to 4, the channels or through bores or holes 102 into which the wires 104 are to be introduced may be formed by conventional techniques such as electric discharge machining (EDM), grinding, spark eroding, or using a laser or other similar methods. These channels or longitudinal bores 102 may be formed, for example, after the sintering process of the cutting element 1, or in a pre-formed substrate before sintering with the diamond grains to form the cutting element, or in situ through inclusion of a plug that is removed after sintering.

In some examples, in particular where the super hard portion comprises PCD material, the hard portion may be treated to have a surface volume that includes no more than 2 wt. % metallic material such as residual catalyst binder.

In some examples, such cutting elements may have a generally cylindrical shape. In other examples, the cutting elements be a different shape, such as conical, or ovoid.

In some examples, the superhard portion 1 may be formed as a standalone object, that is, a free-standing unbacked body of material such as PCD material, and may be attached to a substrate 10 in a subsequent step.

It will therefore be seen that various versions of the present disclosure include sensor elements which may, for example, be in the form of cutting elements, and methods of forming same for earth-boring drill bits which may provide an indication of characteristics of the material being worked by cutting elements that is obtained directly from locations at the drill bit to which they are mounted and used. The sensor elements may be used to identify real-time information which may assist in reducing the risk of loss or damage to the cutting elements and/or the earth-boring drill bit to which the cutting elements are mounted.

Although the foregoing description contains many specifics, these are not to be construed as limiting the scope of the present disclosure, but merely as providing certain exemplary versions. For example, whilst Ni—Cr and/or Cu electrodes have been described as forming the sensor element to be attached to the cutting element 1, alternative sensor elements are envisaged such as a sensing element comprising boron-doped diamond.

The invention claimed is:

1. A cutting element for a cutting tool, comprising:
a sensor element;
a body of super hard material having a working surface; the sensor element being attached to a portion of the super hard material; and
one or more conducting wires extending from the sensor element through one or more channels extending through the body of super hard material;
wherein the sensor element is bonded to the body of super hard material through a layer of ceramic adhesive; wherein the body of super hard material has the working surface and a cavity in the working surface, the layer of ceramic adhesive coating a region of the body of super hard material defining a wall of the cavity, the sensor element being located in the cavity and bonded to the body of super hard material defining the wall of the cavity through the ceramic adhesive coating the wall defining the cavity.

2. The cutting element of claim 1, wherein the ceramic adhesive comprises alumina silicate.

3. The cutting element of claim 1, wherein the sensor element comprises an electrochemical sensor.

4. The cutting element of claim 1, wherein the sensor element comprises one or more electrodes for detecting changes in one or more parameters to be measured indicative of the condition of the cutting element in use and/or one or more measurements relating to the nature of a formation being drilled in use.

5. The cutting element of claim 1, wherein the body of super hard material comprises polycrystalline diamond material.

6. The cutting element of claim 1, further comprising a substrate attached to the body of super hard material along an interface spaced from and opposing the working surface.

7. The cutting element of claim 6, wherein the substrate comprises a cemented carbide material.

8. The cutting element of claim 6, wherein the one or more channels and conducting wire(s) extend through the substrate.

9. The cutting element of claim 1, wherein the one or more conducting wires are spaced from a wall of the respective channel(s) through which they extend by a layer of insulating material.

10. The cutting element of claim 9, wherein the layer of insulating material is bonded to a region of the wall of the respective channel(s) by a layer of ceramic adhesive.

11. The cutting element of claim 10, wherein the layer of ceramic adhesive bonding the insulating material to the wall of the respective channel(s) comprises alumina silicate.

12. The cutting element of claim 1, wherein an electrical pathway extends through the super hard portion and any substrate attached thereto and is insulated therefrom.

13. The cutting element as claimed in claim 1, wherein the body of super hard material comprises polycrystalline diamond (PCD) material and comprises a surface volume that includes no more than 2 wt. % metallic material.

14. An earth-boring tool, comprising:
a body;
at least one cutting element according to claim 1 attached to the body; and
a data acquisition module configured to receive a signal from the sensor element in the cutting element, through the one or more conducting wires.

15. A method of forming a cutting element for a cutting tool comprising:
a body of super hard material bonded to a substrate along an interface, the body of super hard material having a working surface spaced from and opposing the interface with the substrate; the cutting element further comprising one or more channels extending through the body of super hard material and substrate;
inserting one or more insulated conducting wires in a respective one or more of said channels;
applying a layer of ceramic adhesive to a portion of the working surface defining a wall of a cavity therein and/or to at least a portion of the surface defining the wall of a respective channel(s) external to the insulated conducting wire(s);
heating the ceramic adhesive to bond the adhesive to the portion of the working surface and portion of the surface defining the wall(s) of the respective channel(s);
locating a sensor element in the cavity and applying a heat treatment to bond the sensor element the body of super hard material through the layer of ceramic adhesive and electrically connect the one or more conducting wires to the sensor element.

16. The method of claim 15, wherein the method further comprises treating the portion of the working surface defining the wall of the cavity therein to increase surface energy of the portion prior to the step of applying the layer of ceramic adhesive.

17. The method of claim 16, wherein the step of treating comprises oxidising the portion of the working surface defining the wall of the cavity therein to form an oxidised surface.

18. The method of claim 17 further comprising treating the oxidised surface with a mixture of methane and hydrogen ($CH_4/H_2$).

19. The method of claim 15, further comprising treating at least a portion of the surface of the insulated conducting wire(s) to form a layer of oxide on said surface.

20. The method of claim 15, wherein the body of super hard material comprises polycrystalline diamond material.

21. The method of claim 15, wherein the step of locating the sensor element comprises locating one or more electrodes to form the sensor element.

22. The method of claim 21, wherein the step of locating the electrodes comprises inserting a first mass of Ni—Cr powder into the cavity and laser sintering the powder to form a first layer; and applying one or more additional masses and one or more sintering processes to generate a layered sintered structure within the cavity.

* * * * *